May 11, 1943.  F. R. CONKLIN  2,319,040
METHOD OF FORMING PARTICLES OF THERMOPLASTIC MATERIALS
Filed Dec. 28, 1939  2 Sheets-Sheet 1
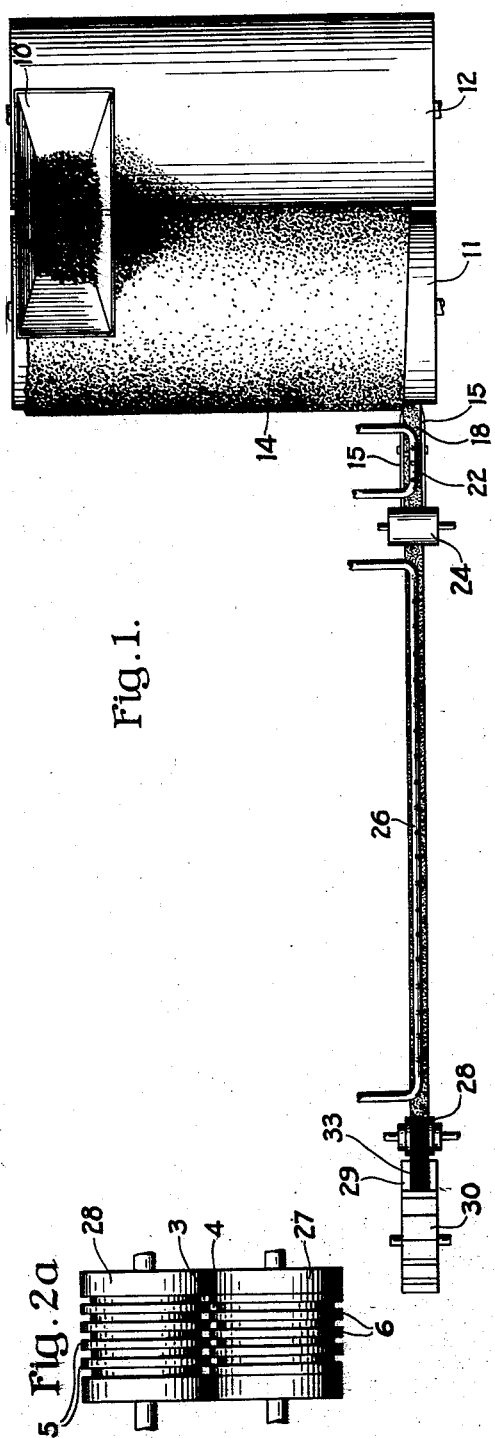
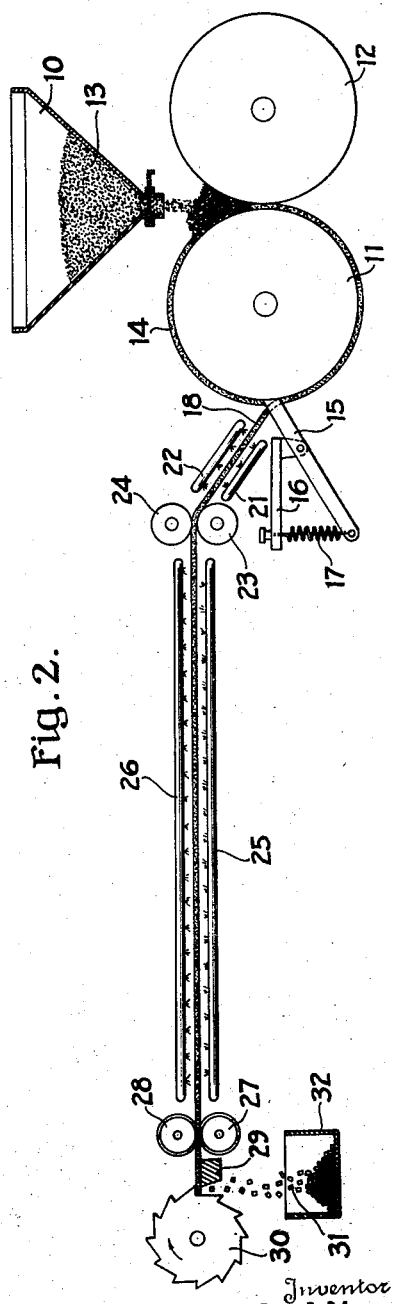
Inventor
Frederick R. Conklin May 11, 1943.  F. R. CONKLIN  2,319,040
METHOD OF FORMING PARTICLES OF THERMOPLASTIC MATERIALS
Filed Dec. 28, 1939  2 Sheets-Sheet 2

Inventor
Frederick R. Conklin
By N. M. Perrins
Daniel J. Mayne
Attorneys

Patented May 11, 1943

2,319,040

UNITED STATES PATENT OFFICE 2,319,040

METHOD OF FORMING PARTICLES OF THERMOPLASTIC MATERIALS

Frederick R. Conklin, Kingsport, Tenn., assignor to Eastman Kodak Company, Rochester, N. Y., a corporation of New Jersey Application December 28, 1939, Serial No. 311,382

3 Claims. (Cl. 18—55)

This invention relates to the manufacture of plastic products and more particularly to an improved continuous process for making colloidized organic thermoplastic materials with a particle size suitable for use in injection molding processes from thermoplastic resins and cellulose organic acid derivative compositions, especially those having a basis of cellulose acetate and cellulose acetate butyrate.

In my related Patents 2,048,686 of July 28, 1936, and 2,155,303 of April 18, 1939, methods are described for making colloidized thermoplastic materials suitable, when granulated, for use in injection molding processes. In these processes the mixture of finely divided cellulosic material and plasticizer are rolled on hot rolls to colloidize these components. The rolling action intimately mixes the plasticizer and cellulose base material and exerts a shearing force thereon which tends to subdivide the hot colloidized material and to produce a homogeneous, uniform composition. At the end of the rolling treatment, the composition is collected on one roll in a layer. It is then cut off the roll and if the composition is to be employed in injection molding, the layer is broken up and fed to a granulator and thus subdivided into small granules. Granules of uniform size are then selected, the finer or coarser granules being discarded.

The granulating operation thus produces materials which can not be used and necessitates a selecting operation which further slows down production. In short the necessity of removing fine or coarse pieces after the granulating operation, as well as caring for the waste produced thereby, the production of the composition by a batch rather than a continuous process, and the probable variation in the rolling of the individual batches, all affect the cost and uniformity of the product.

An object therefore of the present invention is a continuous process for the production of particles of organic thermoplastic material which are uniform in size and in composition.

Another object is a continuous process for the production of organic thermoplastic particles of uniform size without the production of particles of non-uniform size.

In accordance with the invention these and other objects are attained by hot rolling finely divided particles of the organic base material of the plastic composition, which are mixed with plasticizer and if desired, with fillers and/or coloring materials, on a pair of parallel positioned rolls one of which at least is maintained at a temperature above that of the boiling point of water, and more particularly within a range of from approximately 212° F. to 370° F. Preferably the temperature of one roll is maintained approximately 100° F. or more higher than the other so that the composition will gradually collect thereon.

By continuously adding a uniform amount of the mixture at one end of these relatively closely spaced rolls which rotate in opposite directions the resulting thermoplastic mass will work gradually around and along the rolls, during which it will become thoroughly colloidized, and a narrow relatively thin strip of the colloidized plastic mass can be continuously removed from the opposite end of the rolls. This narrow, thin strip is then positively cooled somewhat and is sliced lengthwise and is then cut while still in a semi-plastic state, into very short uniform lengths thereby producing particles of the plastic composition of substantially uniform dimensions. Because the strip is relatively plastic while being cut, substantially all of the composition is made into usable particles without any "fines" normally produced by the shattering action of granulators. The temperature of the cooled sheet will normally fall within a range of from 100 to 300° F. In general it may be said that the temperature to which the thermoplastic strip is cooled before cutting depends upon the flow of the material and its tendency to stick onto the cooling rolls.

The invention will be more clearly understood by reference to the following detailed description and drawings in which:

Fig. 1 is a diagrammatic plan view of the preferred apparatus showing the process of forming the mixed composition into uniform sized particles.

Fig. 2 is a diagrammatic elevational view of the apparatus.

Fig. 2a is an end elevational view of the slicing mechanism.

Figure 4:
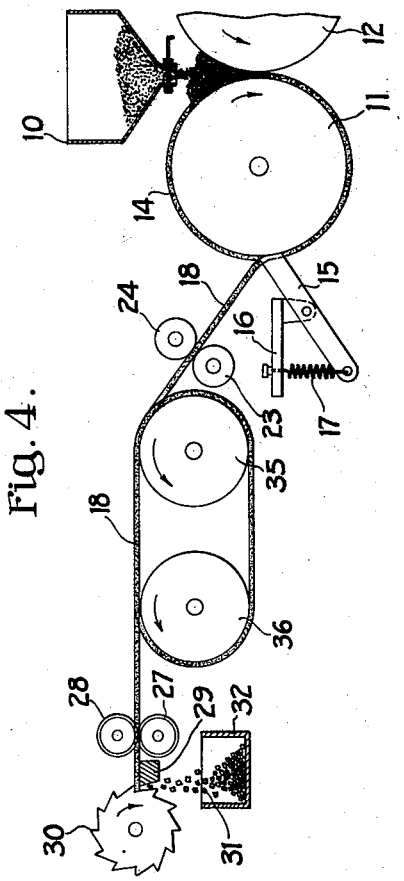
Fig. 4 is a sectional elevational view of another form of the apparatus which employs two cooling rolls.

For convenience of discussion and illustration, the present invention is described with particular reference to cellulose acetate plastics, but the process is equally applicable to the continuous production of improved plastic products from any of the various cellulose organic derivatives such as cellulose propionate, cellulose butyrate, cellulose acetate propionate, cellulose acetate butyrate, methyl ether, ethyl ether, benzyl ether, and the like as well as the thermoplastic resins such as acetal resins and others known to the art.

The initial step in preparing the molding composition is the mixing in a suitable mixer of an appropriate amount of the finely divided base material of the composition with a compatible plasticizer and any other addition such as dyes, pigments, pearl essence or other necreous forming materials, fillers and the like which may be desired. While various types of mixers may be employed, one may use the type of mixer and, if applicable, the method described in Palmer Patent 2,150,939 of March 21, 1939.

The process of the present invention will be more clearly understood by referring to Figs. 1 and 2 which show apparatus comprising a hopper 10 positioned above a pair of rolls 11 and 12. These rolls are internally heated by any suitable method known to the art, and roll 11 is heated higher than roll 12 so that the plastic material will collect thereon. The hot roll may be at 370° F. and the cooler roll at 250° F. One or both rolls may be driven from a prime mover, not shown. If desired a plate or other suitable mechanical device (not shown) can be associated with the ends of the rolls adjacent the hopper to retain the granular material on the rolls.

A stripper blade 15 pivotally mounted on support 16 and held against roll 11 by spring 17 is arranged to remove a narrow strip 18 of the plastic material from roll 11.

A set of air jets 21 and 22 are positioned near the roll 11 for cooling the sheet, and draw off rolls 23 and 24 pull the sheet from the roll 11 and between air jets 21 and 22. The longitudinal slicing rolls 27 and 28 draw the sheet through a second set of cold air jets 25 and 26 and slice the sheet into a plurality of strips 33. The strips 33 are conducted across platen 29 to engage the rotary cutter 30 which operates continuously to cut the hot strips into uniform lengths. It will be noted that similar parts of the apparatus shown in Figs. 3, 4 and 5 bear the same numerals.

The mixture 13, for example of 100 parts of cellulose acetate and 35 parts of tripropionin, is added to the hopper 10 and permitted to flow continuously onto the rolls 11 and 12 at one end where it is worked therebetween. The mixture will gradually adhere to the hotter roll 11 as shown at 14 and work spirally around the roll to its opposite end. The thermoplastic composition owing to the heat and mixing action of the rolls will become colloidized and homogeneously mixed. A narrow strip 18 is then cut off the roll by the action of knife 15 and is fed, as heretofore explained, through the apparatus. The strip 18 in volume represents the amount of new material added on the input end of the rolls. Strip 18 is cooled by air jets 21 and 22 below its substantial adhering point and will not adhere to draw off rolls 23 and 24 which aid in pulling the strip from the roll. The strip 18 is further cooled by passing between jets 25 and 26 where it may be supported by spaced apart guide members, not shown. It will be understood, however, that the strip is still in a hot semi-plastic state. Slicing rolls 27 and 28 draw the sheet through the air jets, slice the sheet into a plurality of strips 33, and push the strip into cutter 30 which is adjusted to cut the strip into uniform lengths thereby producing particles of substantially uniform dimensions which are collected in bin 32.

The longitudinal slicing mechanism comprises coacting rolls 27 and 28. Roll 27 has a plurality of raised cutting members 5 and a plurality of grooves 3 therebetween. Roll 28 also has a plurality of cutting members 6 and a plurality of grooves 4 therebetween. As shown in the drawing the rolls are so positioned that the cutting members of the respective rolls will slightly enter and rotate in the grooves of the other roll leaving, however, a space for the slit material to pass. As shown in the drawings the strips 33 are collected on the platen and are then cut by the cutter 30 into substantially uniform lengths.

If desired bin 32 may be suitably cooled to bring the temperature of the particles quickly down to room temperature. If the particles of some materials tend to adhere into clusters in the bin they may be caused to slide over a cooled chute to lower their temperature before they pile up in the bin.

Because the sheet is cut while in a hot semi-plastic state there are no "fines," that is, powder-like particles formed and no separating step is, therefore, required to eliminate fine or large granules. In general the particle size is from $\frac{1}{16}$ to $\frac{1}{8}$ inch square.

Figure 3:
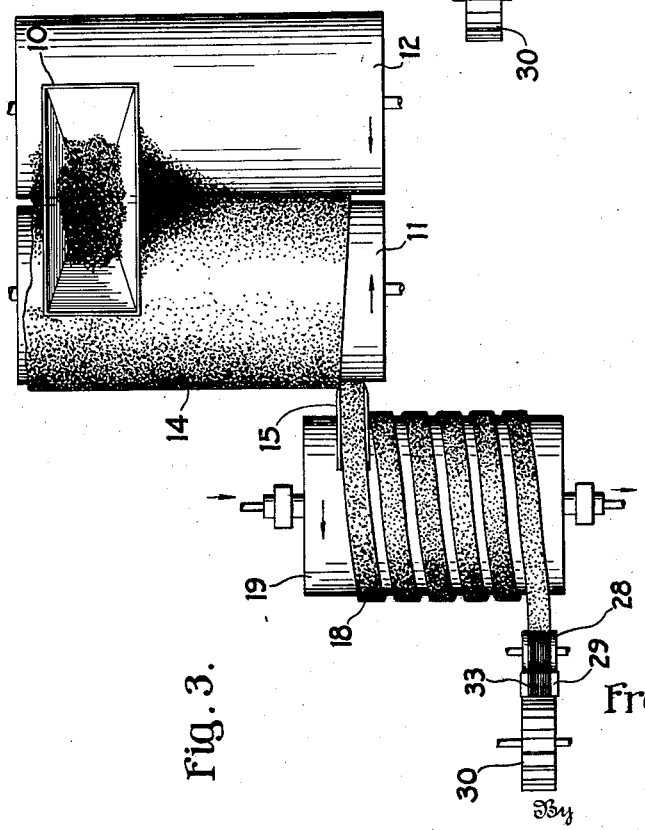
Fig. 3 is a plan view of an alternate form of the apparatus showing a different means of cooling the sheet comprising a large cooling roll.

Referring to Fig. 3 the strip 18 is shown being removed from rolls 11 and 12 by knife 15. The strip 18 is then conducted spirally around cold roll 19 and then between slicing rolls 27 and 28 and is cut by the cutter 30 as heretofore described. The temperature of the roll 19 may be kept low by passing cold water therethrough.

Figure 5:
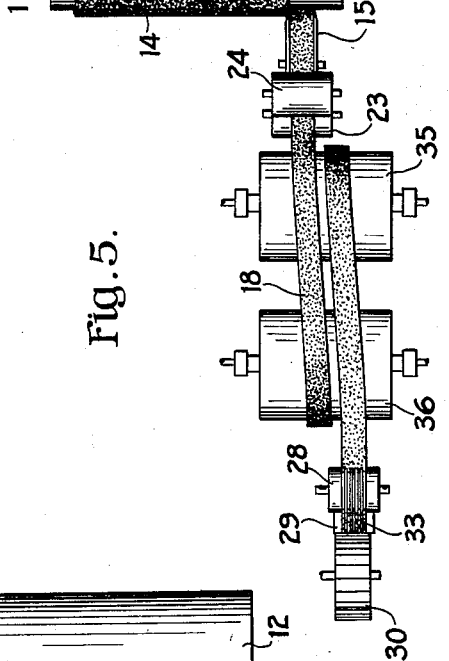
Fig. 5 is a plan view of Fig. 4 illustrating in particular the path taken by the strip around the rolls.

Referring to Figs. 4 and 5 the strip 18 is removed from the rolls 11 and 12 and aided by rolls 23 and 24 is conducted to the pair of cooling rolls 35 and 36. As is apparent from the drawings the strip passes about the rolls and then is conducted to the cutter 30 by rolls 27 and 28.

The various rolls of the appartus shown in the drawings may be caused to rotate by suitable mechanisms not shown. Also the heating and cooling fluids may be introduced into the rolls through their shafts (not shown) as is well known in the art.

While in the above described drawings the thermoplastic mixture is shown being added at one end of the rolls and being removed in a colloidized strip at the other end, by suitable re-arrangement of the apparatus, the mixture could be added at the extremes of the rolls and removed in a strip at the middle of the rolls; or it could be added to the middle and removed at the extremities of the rolls. It is also within the purview of the invention to remove and cut up more than one strip from the rolls at the same time.

The particles thus produced are particularly valuable forms of molding composition. Each of the particles may be regarded as a sealed agglomerate of smaller colloidized particles homogeneously welded together into a unit which resists the penetration of moisture. As described in my Patent No. 2,115,303 of April 18, 1939, treating the composition on hot rolls, as herein specified, reduces the moisture content to below 0.5% thereby eliminating a prime cause of warping and deterioration. Accordingly these uniform sized particles are substantially moisture free, As shown by photomicrographs there particles, when injection molded, form a product having an extremely dense and compact internal structure, free from gas pockets, bubbles or sponginess.

While the process is illustrated by employing as an example of a thermoplastic composition one composed of cellulose acetate and tripropionin, as above suggested, the process is applicable to various other thermoplastic compositions some of which are shown in the following examples:

*Example II*

| | Parts |
|---|---|
| Cellulose acetate | 100 |
| Dimethyl phthalate | 35 |

*Example III*

| | Parts |
|---|---|
| Cellulose acetate propionate | 100 |
| Dimethyl phthalate | 35 |

*Example IV*

| | Parts |
|---|---|
| Cellulose propionate | 100 |
| Dibutyl phthalate | 40 |

*Example V*

| | Parts |
|---|---|
| Cellulose acetate butyrate | 100 |
| Diamyl phthalate | 30 |

*Example VI*

| | Parts |
|---|---|
| Cellulose acetate butyrate | 100 |
| Dibutyl phthalate | 20 |

Typical examples of plasticized resin compositions are the following:

*Example VII*

| | Parts |
|---|---|
| "Vinylite X" | 100 |
| Dimethyl phthalate | 10 |

*Example VIII*

| | Parts |
|---|---|
| "Vinylite X" | 100 |
| Diethyl phthalate | 10 |

*Example IX*

| | Parts |
|---|---|
| "Vinylite X" | 100 |
| Dibutyl sebacate | 10 |

I understand "Vinylite X" to be a polyvinyl butraldehyde acetal resin containing a hydroxyl group content equivalent to about 20% by weight of polyvinyl alcohol.

*Example X*

| | Parts |
|---|---|
| "Formalvar" resin | 100 |
| Dimethyl phthalate | 10 |

I understand that a "Formalvar" resin is a mixed polyvinyl acetal resin and more particularly is a polyvinyl formaldehyde acetaldehyde.

*Example XI*

| | Parts |
|---|---|
| "Alvar" resins | 100 |
| 50% dimethyl phthalate } 50% dimethyl sebacate } | 20 |

An "Alvar" resin I believe is a polyvinyl acetaldehyde acetal resin.

These formulaes can be mixed in a suitable mixer and added to the hopper of the rolling apparatus as is apparent from the above description.

I claim:

1. The continuous process of making particles of organic thermoplastic compositions adapted for use in injection and extrusion molding operations without producing fines which comprises continuously adding a suitable mixture of organic material to parallel relatively closely spaced heated milling rolls, colloidizing the mixture by working it between the rolls in such a manner as to move the colloidized mixture progressively along and around one of the rolls in the form of a continuous coherent blanket substantially coextensive with the roll, continuously removing a strip of the progressively moving coherent colloidized composition from said roll at a point remote from the point at which the material is added, the rate of addition of the material and its removal in the strip being substantially equal whereby said roll is continuously covered with the coherent mixture, partially cooling the strip to an elevated temperature intermediate that of the rolls and room temperature and cutting the strip into small particles while at substantially said intermediate temperature.

2. The continuous process of making particles of organic thermoplastic compositions adapted for use in injection and extrusion molding operations without producing fines which comprises adding a mixture comprising a cellulose organic acid derivative and a plasticizing amount of a compatible plasticizer to relatively closely spaced heated milling rolls, colloidizing the mixture by working it between the rolls in such a manner as to move the colloidized mixture progressively along and around one of the rolls in the form of a continuous coherent blanket substantially coextensive with the roll, continuously removing a strip of the progressively moving coherent colloidized composition from said roll at a point remote from the point at which the material is added, the rate of addition of the material and its removal in the strip being substantially equal whereby said roll is continuously covered with the coherent mixture, partially cooling the strip to an elevated temperature intermediate that of the rolls and room temperature and cutting the strip into small particles while at substantially said intermediate temperature.

3. The continuous process of making particles of organic thermoplastic compositions adapted for use in injection and extrusion molding operations without producing fines which comprises mixing a plasticizer with a cellulose organic acid derivative, adding the mixture continuously between parallel relatively closely spaced heated milling rolls at a point approximately mid way in length, colloidizing the mixture while working it first between the rolls and then spirally around and along one of the rolls from the midpoint to the ends thereof, continuously removing a narrow strip of the material from each of the ends of said roll, the rate of addition of the material and its removal in the form of the strips being substantially equal, partially cooling the strips, and cutting them into small uniform particles while they are above a temperature at which the cutting operation will produce fines.

FREDERICK R. CONKLIN.